United States Patent [19]

Marosi

[11] Patent Number: 4,859,443
[45] Date of Patent: Aug. 22, 1989

[54] PREPARATION OF SILICON NITRIDE POWDER

[75] Inventor: Laszlo Marosi, Ludwigshafen, Fed. Rep. of Germany

[73] Assignee: BASF Aktiengesellschaft, Ludwigshafen, Fed. Rep. of Germany

[21] Appl. No.: 195,817

[22] Filed: May 19, 1988

[30] Foreign Application Priority Data

May 22, 1987 [DE] Fed. Rep. of Germany ....... 3717284

[51] Int. Cl.$^4$ .................... C01B 21/063; C01B 33/06; B05D 7/00
[52] U.S. Cl. ................................... 423/344; 423/413; 423/470; 423/471; 427/213
[58] Field of Search ............... 423/344, 413, 470, 471; 427/213

[56] References Cited

U.S. PATENT DOCUMENTS

| 4,196,178 | 4/1980 | Iwai et al. | 423/290 |
| 4,505,720 | 3/1985 | Gabor et al. | 427/250 |
| 4,619,905 | 10/1986 | Natansohn et al. | 423/344 |

FOREIGN PATENT DOCUMENTS 2915023 11/1979 Fed. Rep. of Germany .

Primary Examiner—John Doll
Assistant Examiner—Lori S. Freeman
Attorney, Agent, or Firm—Keil & Weinkauf

[57] ABSTRACT

Silicon nitride powder is prepared in a gas-phase reaction by reacting silicon tetrachloride with ammonia at above 500° C. in a fluidized bed of silicon nitride particles. An amorphous silicon nitride having a BET specific surface area of greater than 50 m$^2$/g is used at the beginning of the reaction. The resulting silicon nitride is then separated from the ammonium chloride simultaneously formed.

5 Claims, No Drawings

PREPARATION OF SILICON NITRIDE POWDER

The present invention relates to a process for the preparation of silicon nitride powder by reacting silicon tetrachloride with ammonia in the gas phase.

Now that workpieces made of sintered silicon nitride are becoming increasingly important owing to their great hardness and their high heat resistance, the processes for the preparation of the silicon nitride powder required as starting material are also attracting more and more attention.

There are four different processes for the preparation of silicon nitride (German Patent No. 2,915,023), ie.

(1) direct nitrogenation processes in which the silicon is heated to elevated temperature in the presence of ammonia or nitrogen,
(2) processes in which silica is used as a starting material and is heated with carbon in the presence of nitrogen, i.e. in which the reduction and nitrogenation are carried out simultaneously,
(3) reaction of silicon tetrachloride with ammonia in the gas phase at elevated temperature and
(4) thermal decomposition of silicon imide obtained by reaction of silicon tetrachloride with ammonia in the liquid phase and subsequent thermal decomposition of the said imide to give silicon nitride.

Among these processes, only the process identified under (1) has become established in industry, although it also has a number of disadvantages. For the preparation of silicon nitride of high purity, this process also requires the use of very pure silicon, which is expensive to prepare.

In the process identified under (3), the silicon tetrachloride required as starting material can easily be prepared in high purity by distillation, but there are some process-related disadvantages, especially the fact that the nitride formed is deposited on the walls of the reactor and have to be removed from there in some way. This process is therefore more suitable for coating surfaces with silicon nitride than for the preparation of silicon nitride powder.

It is an object of the present invention to eliminate the disadvantages in a process for the preparation of silicon nitride powder by reaction of silicon tetrachloride with ammonia at above 500° C. and separation of the resulting silicon nitride from the ammonium chloride simultaneously formed, and at the same time to obtain a pure silicon nitride powder having a monodisperse particle size distribution.

I have found that good results are achieved if the reaction is carried out in a fluidized bed of silicon nitride particles, an amorphous silicon nitride having a specific surface area of $>50$ m$^2$/g being used at the beginning of the reaction.

In the process of the invention, the silicon nitride formed by reaction of silicon tetrachloride with ammonia is deposited on the silicon nitride serving as the fluidized material. It is essential to use an amorphous silicon nitride powder having a BET surface area of more than 50 m$^2$/g as the first charge. Surprisingly, the silicon nitride forming grows on the silicon nitride particles kept in the fluidized state even when their surface area becomes smaller in the course of the reaction. A silicon nitride having a specific surface area of from 200 to 700 m$^2$/g is preferably used as the first charge.

The reaction is carried out at above 500° C., preferably from 800° to 1500° C. At below 1400° C., the predominant product is amorphous silicon nitride, while the predominant product at above 1400° C. is crystalline α-silicon nitride. To achieve complete conversion, ammonia is used in excess of the stoichiometric amount, in accordance with the equation:

$$3SiCl_4 + 16NH_3 \rightarrow Si_3N_4 + 12NH_4Cl$$

Advantageously, ammonia is used in from 1.5 to 4 times the stoichiometric amount.

The fluidizable material can be fluidized using either a gas which is inert to the reactants, such as nitrogen, or ammonia itself, which may be diluted with nitrogen.

The amount of the reactants introduced into the fluidized bed depends on the reaction temperature. The higher the reaction temperature, the higher the possible throughput of SiCl$_4$ per unit time.

The fine fractions which emerge from the fluidized bed together with the fluidizing gas can be separated off in a downstream cyclone and can be recycled continuously or batchwise to the fluidized bed. The cyclone should advantageously be maintained at a temperature such that the ammonium chloride simultaneously formed is not deposited but is condensed by cooling only in a downstream stage and is separated off.

It is advantageous to carry out the process in such a way that a part stream having the desired particle size is taken off continuously from the fluidized bed and, if necessary, is heated in a further stage, in a stream of ammonia, hydrogen or nitrogen, until any Si(NH)$_2$ present, which is formed as the primary product in the reaction, is converted into Si$_3$N$_4$.

The silicon nitride prepared according to the invention can advantageously be used for the production of high quality ceramics or as powder for coating various workpieces, for example by sputtering. Depending on the surface, these materials can also be used as catalyst carriers, particularly in reactions where high requirements have to be met with regard to the chemical stability of the carrier when exposed to heat, acids and bases.

EXAMPLE 60 g of finely divided amorphous Si$_3$N$_4$ which has a BET surface area of 320 m$^2$/g and has been prepared by thermal decomposition of Si(NH)$_2$ at 800° C. are initially introduced into a fluidized-bed oven. The fluidizable material is kept in the fluidized state by means of dry nitrogen which has been freed from oxygen.

36 ml/h of silicon tetrachloride and 60 l/hour of NH$_3$ (corresponding to 2.7 times the stoichiometric amount) are simultaneously passed into the fluidized bed oven, which is kept at 870° C. The duration of the experiment is 21.2 hours.

The total yield of silicon nitride is 96.1%. The product obtained has a specific surface area of 1 m$^2$/g and chemical analysis shows that is contains 58.8% by weight of Si and 39% by weight of N.

The reaction can also be carried out continuously.

I claim:

1. A process for the preparation of silicon nitride powder by reaction of silicon tetrachloride with ammonia at above 500° C. and separation of the resulting silicon nitride from the ammonium chloride simultaneously formed, wherein the reaction is carried out in a fluidized bed of silicon nitride particles, an amorphous silicon nitride having a specific surface area of $>50$ m$^2$/g being used at the beginning of the reaction.

2. The process of claim 1, wherein a silicon nitride having a specific surface area of from 200 to 700 $m^2/g$ is used.

3. The process of claim 1, wherein the reaction is carried out at from 800° to 1500° C.

4. The process of claim 1, wherein ammonia is used in from 1.5 to 4 times the stoichiometric amount.

5. The process of claim 1, wherein a part stream containing silicon nitride having the desired particle size is taken off continuously from the fluidized bed and heated in a further stage in a stream of ammonia, hydrogen or nitrogen until any silicon imide present is converted into silicon nitride.

* * * * *